July 7, 1942.  B. F. TALLEY  2,288,978
GRILLE GUARD
Filed Dec. 17, 1940

Inventor
Benjamin F. Talley
By Watson E. Coleman
Attorney

Patented July 7, 1942

2,288,978

UNITED STATES PATENT OFFICE 2,288,978

GRILLE GUARD

Benjamin F. Talley, Little Rock, Ark.

Application December 17, 1940, Serial No. 370,539

1 Claim. (Cl. 293—55)

This invention relates to a grille guard, and it is an object of the invention to provide a device of this kind to effectively protect the bottom portion of the radiator of a motor driven vehicle against impact.

It is also an object of the invention to provide a device of this kind which, when applied on a vehicle, provides effective means for reinforcing the usual bumper of the vehicle and which also serves as an effective medium to prevent snow from accumulating beneath the vehicle.

Another object of the invention is to provide a guard which fastens at a point below the radiator of the motor driven vehicle and extends up to and is connected to the usual bumper in a manner to effectually prevent the lower portion of the radiator or grille being impacted.

The invention consists in the details of construction and in the combination and arrangement of the several parts of my improved grille guard whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a view in front elevation of a guard constructed in accordance with an embodiment of my invention, the adjacent front end portion of a motor driven vehicle being shown in fragment;

Figure 2 is a vertical sectional view taken through the device as illustrated in Figure 1 with the associated vehicle in fragment and certain of the parts in elevation;

Figure 3 is a fragmentary view in top plan of the inner end portion of the guard.

As disclosed in the accompanying drawing, B denotes the forward portion of the body of a motor driven vehicle which is provided with the usual radiator grille G.

Associated with the front end of the body B is a conventional bumper A.

As herein disclosed, my improved guard comprises a flat plate 1 which underlies the forward portion of the body B. The rear end of this plate 1 is defined by an upstanding flange 2 having its upper marginal portion defined by a rearwardly disposed plate 3 on a plane substantially parallel to the plane of the plate 1. This plate 3 is detachably clamped from below to the front spring S of the vehicle by a conventional U-clamp 4 or otherwise as may be preferred. As illustrated in Figure 2 there may be interposed between this spring S and the plate 3 a washer plate 5.

Lapping the forward end portion of the plate 1 and preferably from below is the inner end portion of a plate 6. This plate 6 is substantially the same width as the plate 1 and is provided along its side portions with the spaced openings 7 which selectively register with openings 8 in the forward portion of the plate 1 for the passage therethrough of the bolts 9 which have threaded thereon the holding nuts 10. These openings 7 and 8 together with the bolts 9 and nuts 10 provide means whereby the plate 6 may be adjustably connected with the plate 1 as the requirements of practice may necessitate.

The outer or front end of the plate 6 is continued by an elongated guard arm C extending a slight distance, as at 11, in advance of the plate 6 proper and then disposed upwardly, as at 12, to terminate at a point closely adjacent to the top portion of the grille G. The lower part of the upwardly disposed portion 12 of the arm C overlies the outer face of the bumper A and is secured thereto by a suitable fastening means 14 herein disclosed as conventional bolts and nuts.

The upper extremity of the portion 12 of the arm C is bolted, as at 15, or otherwise securely attached to the central portion of an elongated brace 16. This brace 16 is above the bumper A and is of a length substantially equal to the length of the bumper A as is illustrated in Figure 1. The extremities of this brace 16 terminate rearwardly of the bumper A and are bolted thereto, as at 17, or otherwise securely attached thereto.

It is also preferred that the guard arm C be of considerable width and gradually decrease from opposite sides in width with its wider end lowermost. It is to be pointed out that the plate 1 and the adjacent end portion of the plate 6 are of material width. This is of prime importance for these parts afford protection to the car when driving through mud, snow and over objects such as rocks, stumps or embankments. These portions which underlie the forward end of the car body also serve to eliminate the liability of the drowning out of the motor during rain, and in snow will permit the under part of the motor to slide over snow without clogging.

From the foregoing description it is thought to be obvious that a grille guard constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

The combination with the body of a motor driven vehicle, a front spring below said body, and a bumper for the front end of the body, of a guard for the lower front end of the body comprising a plate, means for securing the plate to the front spring with the plate extending forwardly from the spring, a second plate, means for securing said second plate to the first plate, a wide guard arm extending outwardly from the second plate, the outer portion of the arm extending upwardly above the bumper, means for securing said arm to the bumper, an elongated brace member for the bumper, means for securing the central portion of the brace member to the upper end portion of the arm, and means for securing the extremities of the brace member to the bumper, the plates and guard arm providing a shoe to afford protection to the body from below against the elements and undue obstructions.

BENJAMIN F. TALLEY.